(12) United States Patent
Padgett (10) Patent No.: US 7,453,767 B1
(45) Date of Patent: Nov. 18, 2008

(54) METHOD FOR DERIVING A 3D GRAZ SEISMIC ATTRIBUTE FILE

(76) Inventor: Michael John Padgett, 3709 Graustark St., Houston, TX (US) 77006

( * ) Notice: Subject to any disclaimer, the term of this patent is extended or adjusted under 35 U.S.C. 154(b) by 252 days.

(21) Appl. No.: 11/481,167

(22) Filed: Jul. 5, 2006

Related U.S. Application Data (63) Continuation-in-part of application No. 10/721,983, filed on Nov. 25, 2003, now Pat. No. 7,206,782, and a continuation-in-part of application No. 11/158,118, filed on Jun. 21, 2005, now Pat. No. 7,266,041.

(51) Int. Cl.
*G01V 1/30* (2006.01)
*G01V 1/34* (2006.01)

(52) U.S. Cl. .................. 367/73; 367/38; 367/72
(58) Field of Classification Search ............. 367/38, 367/72, 73; 702/16
See application file for complete search history.

(56) References Cited

U.S. PATENT DOCUMENTS

| | | | |
|---|---|---|---|
| 5,001,677 A | | 3/1991 | Masters |
| 5,430,689 A | | 7/1995 | Rigsby |
| 5,583,825 A | | 12/1996 | Carrazzone |
| 5,671,136 A | * | 9/1997 | Willhoit, Jr. ............ 702/18 |
| 5,862,100 A | | 1/1999 | VerWest |
| 5,930,730 A | | 7/1999 | Marfurt |
| 6,058,074 A | | 5/2000 | Swan |
| 6,092,025 A | * | 7/2000 | Neff ..................... 702/10 |
| 6,131,071 A | | 10/2000 | Partyka |
| 6,278,949 B1 | * | 8/2001 | Alam .................... 702/16 |
| 6,292,754 B1 | | 9/2001 | Thomsen |
| 6,317,384 B1 | * | 11/2001 | Luo et al. ............... 367/47 |
| 6,463,387 B1 | | 10/2002 | Runnestrand |
| 6,498,989 B1 | | 12/2002 | Pisetski |
| 6,674,689 B2 | * | 1/2004 | Dunn et al. ............. 367/43 |

(Continued)

FOREIGN PATENT DOCUMENTS

WO WO9964896 * 12/1999

(Continued)

OTHER PUBLICATIONS

Freund, J.E. and Williams, F.J. "Dictionary/Outline of Basic Statistics" Dover 1966.

(Continued)

*Primary Examiner*—Jack W Keith
*Assistant Examiner*—Scott A Hughes
(74) *Attorney, Agent, or Firm*—Buskop Law Group, PC; Wendy Buskop (57) ABSTRACT

A method of determining and analyzing spatial changes in the earth's subsurface. The method includes obtaining seismic attribute data as a 3D data volume and obtaining corresponding 3D dip and azimuth as a 3D volume and obtain corresponding 3D reliability volumes or 3D censor volumes which are representative of portions of the volume within in which a reliable dip and azimuth can be determined. The gradient of the seismic attribute data in the direction of structural dip is formed using either a dot product methodology or a derivative methodology after interpolation onto the direction of structural dip. At non-reliability locations or locations where no gradient could be meaningfully computed null values are stored. High gradient values in narrow time or depth ranges which are both statistically significant relative to a background level and contiguous designate regions likely to be proximal to a fluid contact or seismic flat spot.

13 Claims, 10 Drawing Sheets

| Structura Dip Vector (Sd) Components | Partial Derivatives of the Seismic Attribute (At) in each component direction | | Dot Product |
|---|---|---|---|

$$\begin{Bmatrix} Sd(x) \\ Sd(y) \\ Sd(z) \end{Bmatrix} \bullet \begin{Bmatrix} d(At)/dx \\ d(At)/dy \\ d(At)/dz \end{Bmatrix} = [Sd(x) * d(At)/dx] + [Sd(y) * d(At)/dy] + [Sd(z) * d(At)/dz]$$

U.S. PATENT DOCUMENTS

| | | | | |
|---|---|---|---|---|
| 6,735,526 | B1* | 5/2004 | Meldahl et al. | 702/14 |
| 6,865,521 | B1* | 3/2005 | Padgett | 703/2 |
| 7,206,782 | B1* | 4/2007 | Padgett | 707/10 |
| 7,266,041 | B1* | 9/2007 | Padgett | 367/72 |
| 2004/0098200 | A1* | 5/2004 | Wentland et al. | 702/2 |
| 2005/0171700 | A1* | 8/2005 | Dean | 702/16 |

OTHER PUBLICATIONS

Fisher. R.A., and Yatex, F., "Statistical Tables for Biological, Agricultural, and Medical Research, 6th E.," Hafner Publishing, 1963.

Mandel, J "The Statistical Analysis of Experimental Data." Dover, 1964.

Lyons, L., "Statistics for nuclear and particle physics," Cambridge University Press, 1986.

Weisstein, Eric W., "Hotelling T2 Distribution." From Mathworld—A Wolfram Web Resource. http://mathworld.wolfram.com/HotellingT-SquaredDistribution.html.

"The significance of the difference between two means when the population variances are unequal" by B.L. Welch, 1938, 'Biometricka' 29, pp. 350-362.

W.V. Behrens, "Ein beitrag zuf Fehlerberechnung bei wenigen Beobachtungen", 'Landwirtschaftliche Jahrbuecher' 68, pp. 807-837.

"On the Behrens-Fischer Problem: A review", by Seock-Ho Kim and Allan Cohen, University of Wisconsin, 1995. Paper presented at the annual meeting of the Psychometric Society, MN.

Hair, J.F. Black, W.C., Babin, B.J.,Anderson, R.E., Tatham, R.L., "Multivariate Data Analysis, 6th Ed.," Prentice Hall 2006, especially chapters 1, 5, and 8.

Hotelling, H., "Multivariate Quality Control Issustrated by Air Testing of Sample Bombsights." in C Eisenhart, M.W. Hastay, and W.A. Wallis, eds., (cont'd on next line).

"Techniques of Statistical Analysis for Scientific and Industrial Research and Production and Management Engineering." New York: McGraw-Hill, 1947.

* cited by examiner

Figure 1

Figure 2
Vertical slice through a focused Subvolume of Interest

Seismic Attribute and computed local dip vectors data traces of non-null 3D dip data and non-null 3D azimuth data as illustrated by the small arrows

Structural Dip Vector (Sd) Components:
$$\begin{Bmatrix} Sd(x) \\ Sd(y) \\ Sd(z) \end{Bmatrix}$$

• (dot)

Partial Derivatives of the Seismic Attribute (At) in each component direction:
$$\begin{Bmatrix} d(At)/dx \\ d(At)/dy \\ d(At)/dz \end{Bmatrix}$$

$$= [Sd(x) * d(At)/dx] + [Sd(y) * d(At)/dy] + [Sd(z) * d(At)/dz]$$

Dot Product

METHOD FOR DERIVING A 3D GRAZ SEISMIC ATTRIBUTE FILE

CROSS REFERENCE TO RELATED APPLICATIONS

The present application is a CIP to U.S. patent application Ser. No. 10/721,983 filed on Nov. 25, 2003 now U.S. Pat. No. 7,206,782 in addition to U.S. patent application Ser. No. 11/158,118 filed on Jun. 21, 2005 now U.S. Pat. No. 7,266,041.

FIELD

The present invention relates to the generation of oil and gas exploration and production data attributes.

BACKGROUND

The goal of hydrocarbon exploration is to find porous and permeable geologic deposits containing high pore-space saturations of hydrocarbons, under sufficient pressure to allow some mode of commercial production. In pursuit of this goal, companies, countries and individuals collect and process many types of geophysical and geological data. The data is often analyzed to find anomalous zones that can reasonably be attributed to the presence of hydrocarbons.

The usage of 2D and 3D seismic data anomalies has been a standard practice in the petroleum industry since the 1960s. Other geologic and geophysical data anomalies have been tried, sometimes successfully, for over a century. These include various gravimetric, electromagnetic, chemical, biological and speculative methods.

The usage of anomalies for oil and gas detection has been plagued by several problems. First, most remote sensing anomalies (e.g., a 3D seismic amplitude anomaly) cannot be directly tied to a rock property that could be measured in the laboratory or using well logs. Much effort is expended attempting to tie observed anomalies to known rock responses by modeling the expected attribute response or otherwise correlating with a known producing reservoir. This work is often based on the experience of the practitioner.

A second problem is that the anomalies themselves are often evaluated or tied to response models in a qualitative manner. With qualitative assessment as the basis, quantitative, objective and reproducible error analysis has not been possible.

A third problem is that a basic physical property at work in hydrocarbon reservoirs is that both oil and gas are less dense than water. This generally causes oil and gas to accumulate up-structure in the pore-space of potential reservoir rocks. The higher water saturations are found, generally, down-structure. The exception to this is the case of heavy oil which may have a density greater than that of water. In the case of heavy oil, water may accumulate up-structure. This separation of saturations is driven by gravity. When such a separation of fluid types occurs, flat interfaces, in depth, are expected to form.

This separation causes numerous possible classes of data attribute response. First, the hydrocarbon reservoir will have one response for each hydrocarbon type. The water-saturated part of the reservoir may have a second data response and the interfacial area a third type of attribute data response.

The present invention is designed for the detection, quantification and evaluation of the depth and location of interface between lighter and heavier saturating fluids as exhibited in a data attribute dataset and to locate the interface between a water reservoir and a hydrocarbon reservoir. It is designed to quantify the change in a data attribute in the up structure direction from an interpreted water reservoir to the hydrocarbon reservoir part of the dataset. The invention has been designed to overcome these known problems in the art.

The lack of quantification, error analysis, subjectivity of analysis and data quality issues cause variations in the appraisal of data anomalies in oil and gas exploration and production projects. It is not uncommon for different individuals or companies to examine the same anomaly and reach irreconcilably, different conclusions. In many cases, explaining quantitatively why the anomaly of one prospect should be "believed or trusted" more than that of another prospect has not been possible. This lack of trust causes different entities to make drastically different investment decisions concerning prospects based on the same underlying data.

The present embodiments are designed for the quantification and evaluation of data anomalies in the search for producible hydrocarbon deposits. The present embodiments are designed to simultaneously quantify and summarize the hydrocarbon reservoir part of the anomaly, the water reservoir part of the data and the interfacial zone. The embodiments address the case of multiple hydrocarbon zones, e.g., gas over oil over water. The embodiments are designed to test the model wherein gas is less dense than oil and oil is less dense than water, with data responses varying by structural position.

The current embodiments can be used for the quantification of changes in lithology, facies, or rock fabric from one location to another. The current embodiments are designed to function in areas of low signal-to-noise and aid in the determination of data suitability for hydrocarbon detection for the expected rock physics environment. The current embodiment, therefore, can be applied to the detection of subtle hydrocarbon related data anomalies.

The prior art includes isolated instances of attempts to include background analysis of seismic traces to find zones which are anomalous with respect to that background. U.S. Pat. No. 5,001,677 teaches an approach wherein multiple seismic attributes are assigned to a vector space and a background vector is constructed using, in the preferred implementation, the median of a set of attribute vectors along a seismic trace, below a given location on the earth. A distance is measured from the background vector to the data vector at a location of interest. U.S. Pat. No. 6,058,074 teaches an approach to amplitude versus offset trace processing wherein the traces are scaled by means and standard deviations of the data in background windows. Two new volumes of appropriately scaled trace intercept values and trace gradient values are then produced. U.S. Pat. No. 5,862,100 teaches the extraction of anomalous AVO points from associated background points using a statistical description of the AVO background data. This robust method is used when the background can be described by a single statistical distribution. The taught method lacks the ability to handle structured non-statistical background clusters and suffers from sampling errors on some datasets if all background windows are chosen identically.

A need exists for a method to scan large amounts of geophysical data sets systematically and simultaneously to find the presence of hydrocarbons. The method should honor non-statistical and highly structured (due to geology and rock properties) host rock geophysical responses. The method should honor small changes in the host rock layering or composition in constructing background data volumes for normalization and scanning.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present invention in detail, it is to be understood that the invention is not limited to the particular embodiments and that it can be practiced or carried out in various ways.

The present invention was conceived to detect changes in a data set associated with an interface between a water reservoir to a hydrocarbon reservoir in a given focused area for a given geologic unit.

The 3D Graz model of this invention provides the benefit to reduce the number of dry holes that will be mistakenly drilled due to imprecise modeling. The current 3D Graz model will enable better care of wetlands in Louisiana and wilderness area during the drilling process by enabling more accurate drilling.

The method enables better planning of drilling so that less damage to land from dragging rigs, laying pipe, and dredging wetlands is minimized. It is anticipated that this method will be used in both the wetlands of Louisiana, which contains many endangered animals and plants, and in the wilderness areas of Alaska which will no longer be wilderness if multiple dry hole rigs are installed through the preserve.

In addition, the invention was conceived to operate in high noise, low signal to noise environments, where the data quality is poor. A benefit for operating in high noise, low signal to noise environments, is that computation time for determining the exact spot to drill is dramatically reduced. Another benefit of being able to operate in a high noise, low signal to noise environment is the need to collect additional seismic data before exploratory drilling is avoided.

The invention was designed to operate on subtle hydrocarbon indicators, such as seismic amplitude in generally pure oil reservoirs, deep gas reservoirs, or Class II or Class I AVO reservoirs.

The invention was also designed to implicitly characterize the isotropy of the water reservoir and of the hydrocarbon reservoir away from the interface between these reservoirs.

The invention determines errors and uncertainties in all measurements and data attribute results relative to a given hydrocarbon reservoir and corresponding water reservoir and associated interfacial region. By determining errors and uncertainties, this eliminates again, the drill hole drilling phenomena.

The invention addresses the case of multiple hydrocarbon zones, such as, gas over oil over water. By addressing multiple hydrocarbon zones simultaneously, this gives the user the benefit of more accurately determining possible reserves before development decisions are made and of optimally placing development wells and production facilities.

The method is designed to be used for situations where gas is less dense than oil and oil is less dense than water, and data responses vary by structural position, but transition in a narrow range of depths over multiple seismic times. An advantage of the method is its ability to operate when oil is highly viscous, enabling development wells and completions to be more efficiently constructed.

Within a portion of the data attribute dataset, characterizing a single saturating fluid, this invention verifies that the data attribute response is invariant with respect to structural position. The quantification of this invariance and the associated uncertainty allow baselines to be established with respect to which the significance of an interfacial signal can be assessed.

This invention is also designed to quantify responses and quantify response uncertainties in a manner that can be consistently defined, reported and replicated by others. Quantification and replication make the output of this invention suitable for quantitative comparison with rock physics analyses, petro-physical analyses, response modeling and geologic analyses (e.g., fit to structure analysis).

The invention relates to a method for computing a new data attribute for a volume of interest. A volume of interest means, within the context of this patent application, either a geographic volume within a 3D seismic dataset for a hydrocarbon reservoir, an associated water reservoir, contiguous combinations of these or combinations of these with other reservoirs.

The invention is a method of determining the existence of and location of hydrocarbon and water fluid contacts by analyzing spatial changes in 3D seismic data.

Initially, seismic attribute data is obtained as a 3D data volume.

Once the 3D data volume is determined, a 3D dip and azimuth as a 3D volume set is computed. Then corresponding 3D reliability volumes or corresponding 3D censor volumes are derived which are representative of portions of the volume within which a reliable dip and azimuth can be determined.

As the next step, a focused subvolume of interest within the 3D data volume is selected and then locations within the focused subvolume of interest having a signal greater than 10% of a mean value within the 3D reliability volumes or 3D censor volumes across the focused subvolume of interest are identified which form a sequence of reliability locations for further computation and consideration. The selection of a cut-off criteria, like 10% greater (or less) than the mean, is determined by the analyst based on geologic conditions, data integrity, noise level and the need to generate a statistically significant set of reliability locations.

From this sequence of reliability locations, a plurality of vector dips around the reliability locations in the sequence of the reliability locations is determined.

Next, an average for the plurality of vector dips around each reliability location is computed forming a structural dip with a structural dip azimuth, and a structural dip magnitude for each reliability location.

Then a gradient for each attribute file at each reliability location is computed using each formed structural dip. These gradients are then stored for each reliability location along with null values for all non-reliability locations outside the focused subvolume of interest forming a 3D output volume.

Each gradient is computed by interpolating seismic attribute data onto the structural dip vector for each reliability location using grid points around each reliability location, thereby forming projected seismic attribute data and thereby computing at least one derivative along the structural dip vector.

Figure 6:
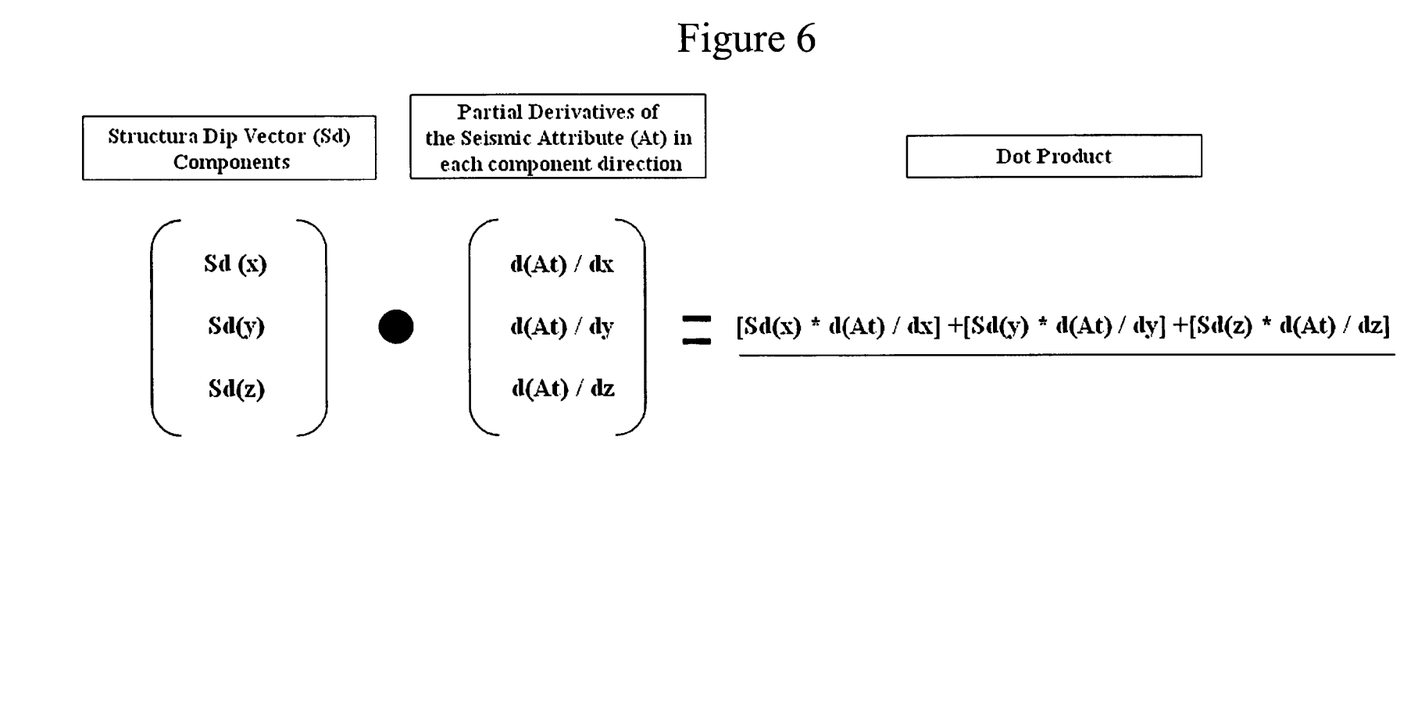
FIG. 6 illustrates the dot product computation of the derivatives usable in the method of the inventor.

The gradient is computed by determining derivatives of the seismic attribute data in at least three coordinate directions, forming a dot product using at least three coordinate direction derivatives and the structural dip vector, as illustrated in FIG. 6.

The attribute file in the method can one member of the following:
a. a set of compiled seismic reflection data processed using a defined attribute generating algorithm;
b. a set of compiled seismic velocity data processed using a defined attribute generating algorithm;
c. a set of geophysical gravity data; such as well based gravity measurements for a set of closely spaced wells
d. a set of geophysical remote sensing data; such as ground penetrating radar stored as a 3D volume
e. a set of compiled geologic measurements such as gas analysis from mudlogging for a set of closely spaced wells
f. a set of petro-physical measurements; such as water saturations using a set of closely spaced wells and
g. combinations of these items.

The invention also relates to computer instructions on computer readable media for determining the existence of a hydrocarbon water interface and/or the existence of a hydrocarbon/hydrocarbon interface.

The seismic attribute is selected from the group: seismic amplitude, inverted seismic amplitude; Hilbert transform output, prestack derived attributes, fluid factor, lamda, rho and mu attributes, multi-attribute classification outputs, seismic velocity or combinations thereof.

The invention is better understood with reference to the Figures.

Given the 3D dip and azimuth as a 3D volume data, corresponding 3D reliability volumes or 3D censor volumes which are representative of portions of the volume of interest within in which a reliable dip and azimuth are derived. An example of derived corresponding 3D reliability volumes or 3D censor volumes are depicted in FIG. 1.

Figure 1:
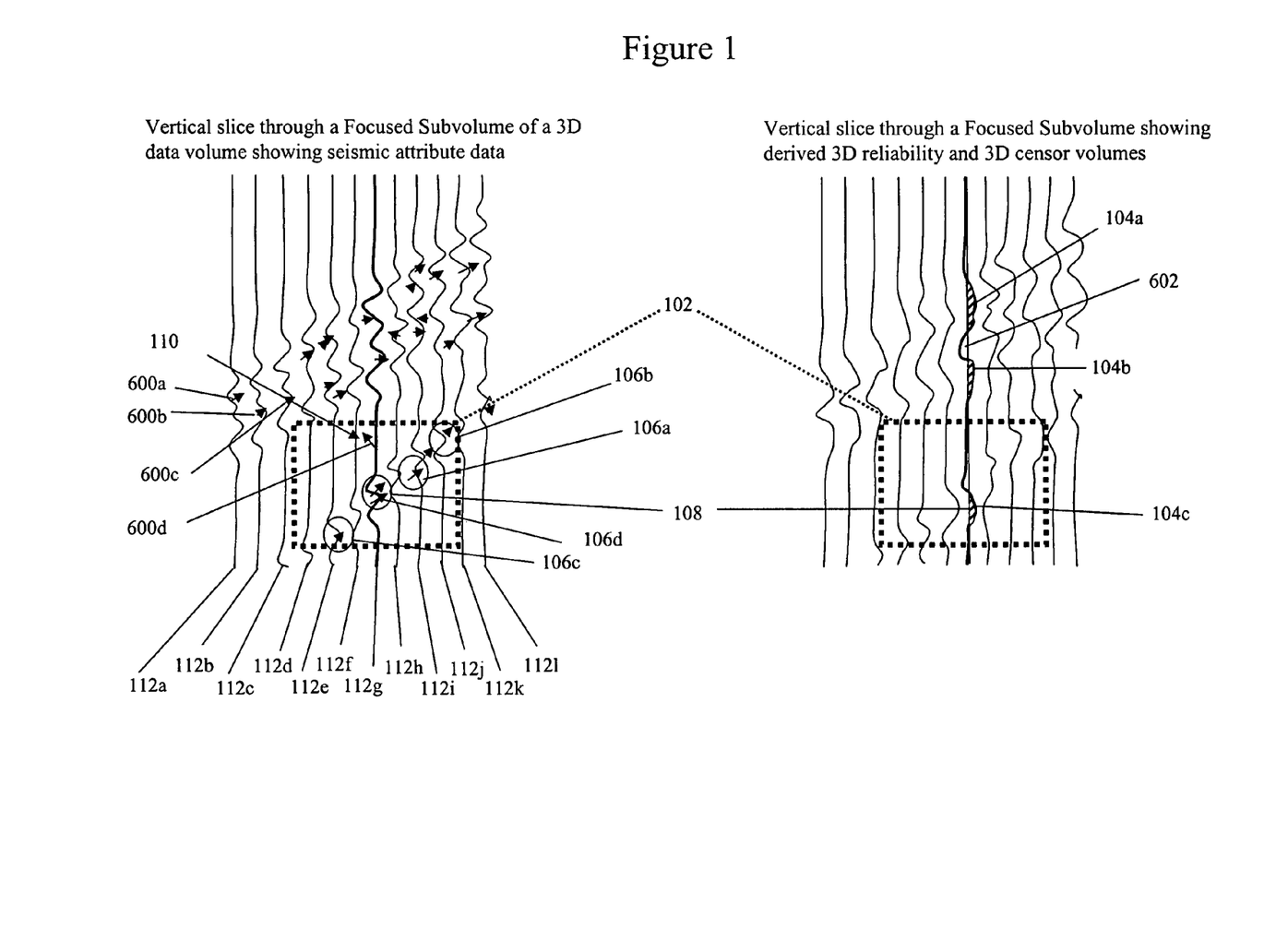
FIG. 1 is an example of derived corresponding 3D reliability volumes and 3D censor volumes for a 3D data volume of 3D dip and azimuth

A focused subvolume of interest within the 3D data volume is then selected, see FIG. 1 element 10 as the focused subvolume of interest.

Locations within the focused subvolume of interest having a signal, for example greater than 10% of a mean value, within the 3D reliability volumes or 3D censor volumes across the focused subvolume of interest are then identified, as reliability locations for further computation and consideration depicted in FIG. 1. The example of greater than 10% can vary according to the location parameters. The selection of a cut-off criteria, like 10% greater (or less) than the mean, is determined by the analyst based on geologic conditions, data integrity, noise level and the need to generate a statistically significant set of reliability locations.

A focused subvolume of interest within the 3D data volume is then selected as the focused subvolume of interest.

Locations within the focused subvolume of interest having a signal greater than 10% of a mean value within the 3D reliability volumes or 3D censor volumes across the focused subvolume of interest are then identified, which have a signal greater than 10% of a mean value with the 3D reliability volumes or 3D censor volumes across the focused subvolume of interest. The selection of a cut-off criteria, like 10% greater (or less) than the mean, is determined by the analyst based on geologic conditions, data integrity, noise level and the need to generate a statistically significant set of reliability locations.

Next, a plurality of vector dips around the reliability locations in the sequence of the reliability locations are identified.

Figure 2:
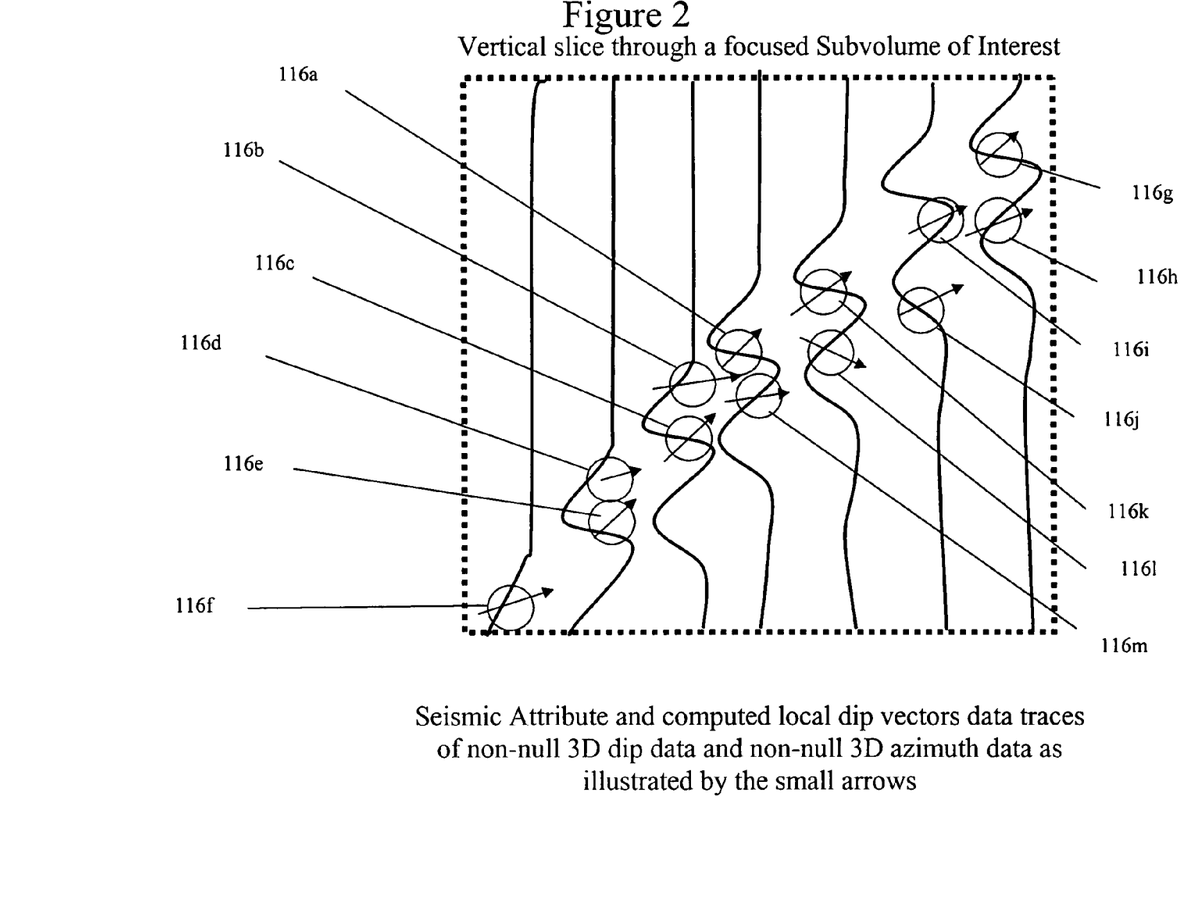
FIG. 2 depicts a group of vector dips around reliability locations in a sequence of reliability locations.

A plurality of vector dips around the reliability locations in the sequence of the reliability locations are identified. FIG. 2 depicts a group of local vector dips at reliability locations shown as elements 118. In addition, FIG. 2 depicts the sequence of reliability locations in the circled grid node location 116. These elements 116 and 118 are shown on a vertical slice through a selected subvolume of interest of a seismic attribute and computed local dip vectors data trace.

Figure 3:
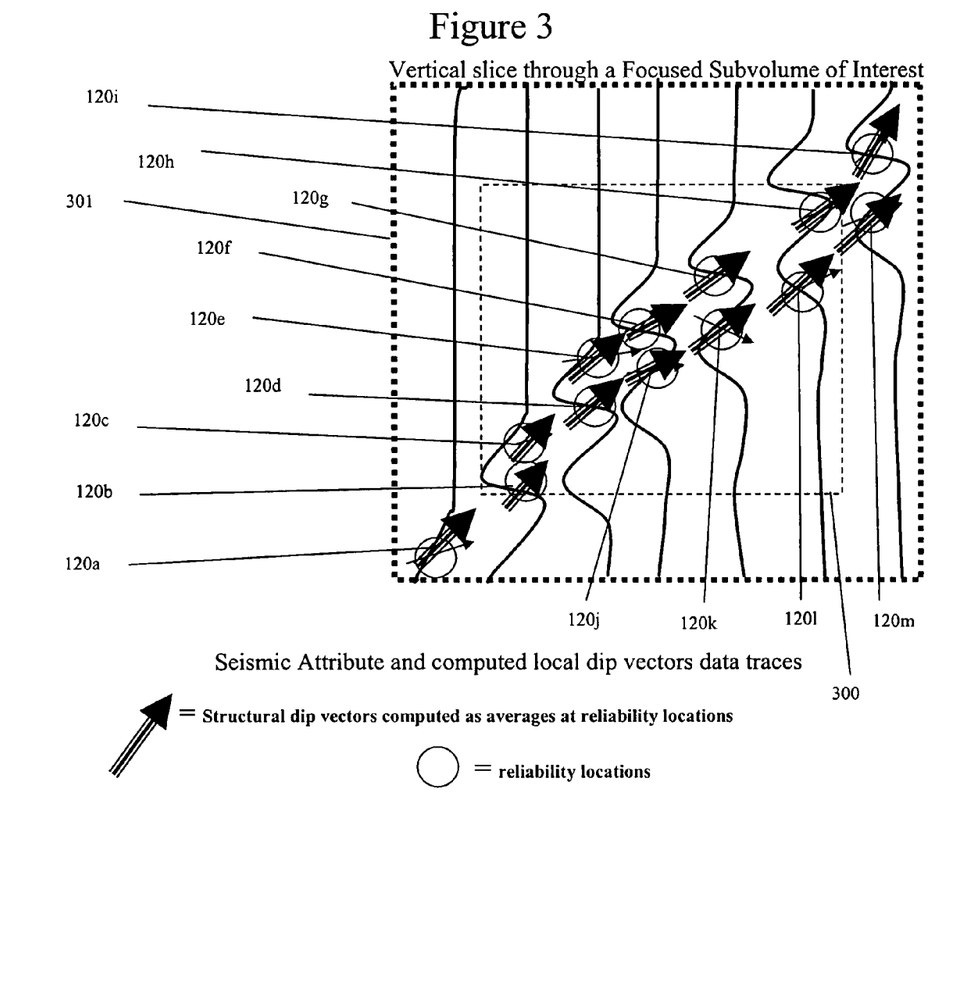
FIG. 3 shows computed structural dips and structural dip magnitudes for reliability locations of FIG. 2.

FIG. 3 also shows a local subvolume of interest 300 interior to the focused subvolume of interest 301 of each reliability location wherein the local subvolume of interest contains 3D dip and azimuth data as a set of vectors is next identified. The local subvolume of interest is normally chosen to include enough grid points above and below a reliability location such that a typical pay sand in the geographic area would be included either above or below the reliability location. For example, if a typical pay sand is 200 ft thick and the background interval velocity is 8000 ft/sec with a 4 MSec sampling rate, then a typical pay sand would be spanned in 50 MSec of 2-way time or 12.5 samples. The local subvolume of interest would then be chosen to be 13 samples above and 13 samples below, spanning a volume of rock roughly 400 feet thick. If the inline and cross-line sampling interval is around 110 feet, then it is normally to sample at least 400 feet in each direction, yielding local subvolume of 8 grid nodes across in each of the x and y (or inline and cross-line) directions. Larger or smaller local subvolumes, may be chosen for the specific needs of a given geologic problem]

An average for the plurality vector dips around each reliability location is computed using a formula such as the example shown below Given a sequence of reliability locations, "Seq" with internal index, r, where r=1, 2, ... Length(Seq), for each dip vector component Vi (i=1, 2, 3) at a reliability location at the grid location X(I,J,K), the structural dip vector components Si may be defined as:

$Si(X(I,J,K))$=Sum over $r\{Vi*W(X(I,J,K), Seq(r))\}$/ Total_Weight where $W(X(I,J,K), Seq(r))$ is the weight function of $X(I,J,K)$ relative to $Seq(r)$ where Total_Weight=Sum over $r\{W(X(I,J,K), Seq(r))\}$ The average of the plurality of vector dips forms at least one structural dip for each reliability location. The structural dips are for the sequence of reliability locations in the circled grid node locations. Between 1 and N structural dips may be computed for any one reliability location in the sequence of the reliability locations, where N is the length of the sequence of reliability locations. In this method it is contemplated that all reliability locations have at least one structural dip vector, normally computed as an weighted average of dip vectors at nearby reliability locations as described by the equation above.

Figure 4:
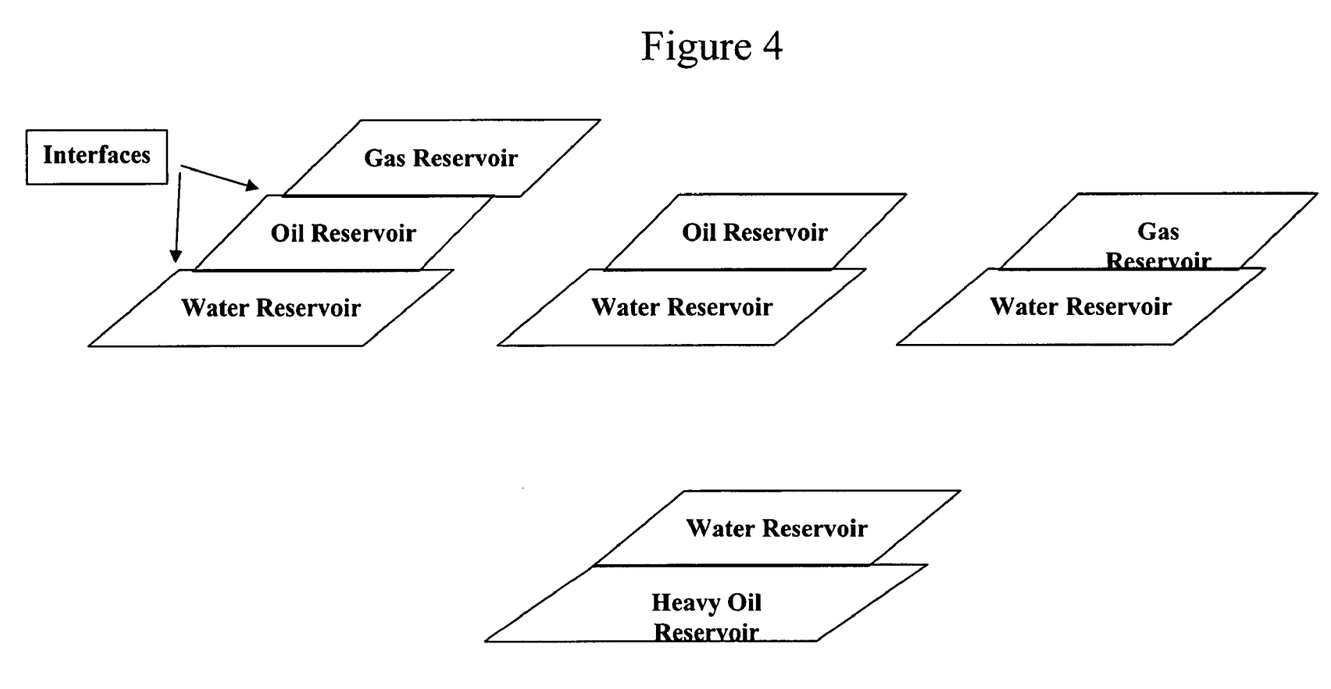
FIG. 4 shows the interface as a plurality of hydrocarbon reservoir types and water reservoirs separated by interfaces.

FIG. 4 shows four different interfaces of hydrocarbon reservoir types with water reservoirs separated by interfaces. Each of these hydrocarbon types and water reservoir geometries produces signatures in 3D seismic attribute data that this method is intended to evaluate. All four configurations represent observed conditions that can be acted on using the method.

Figure 5:
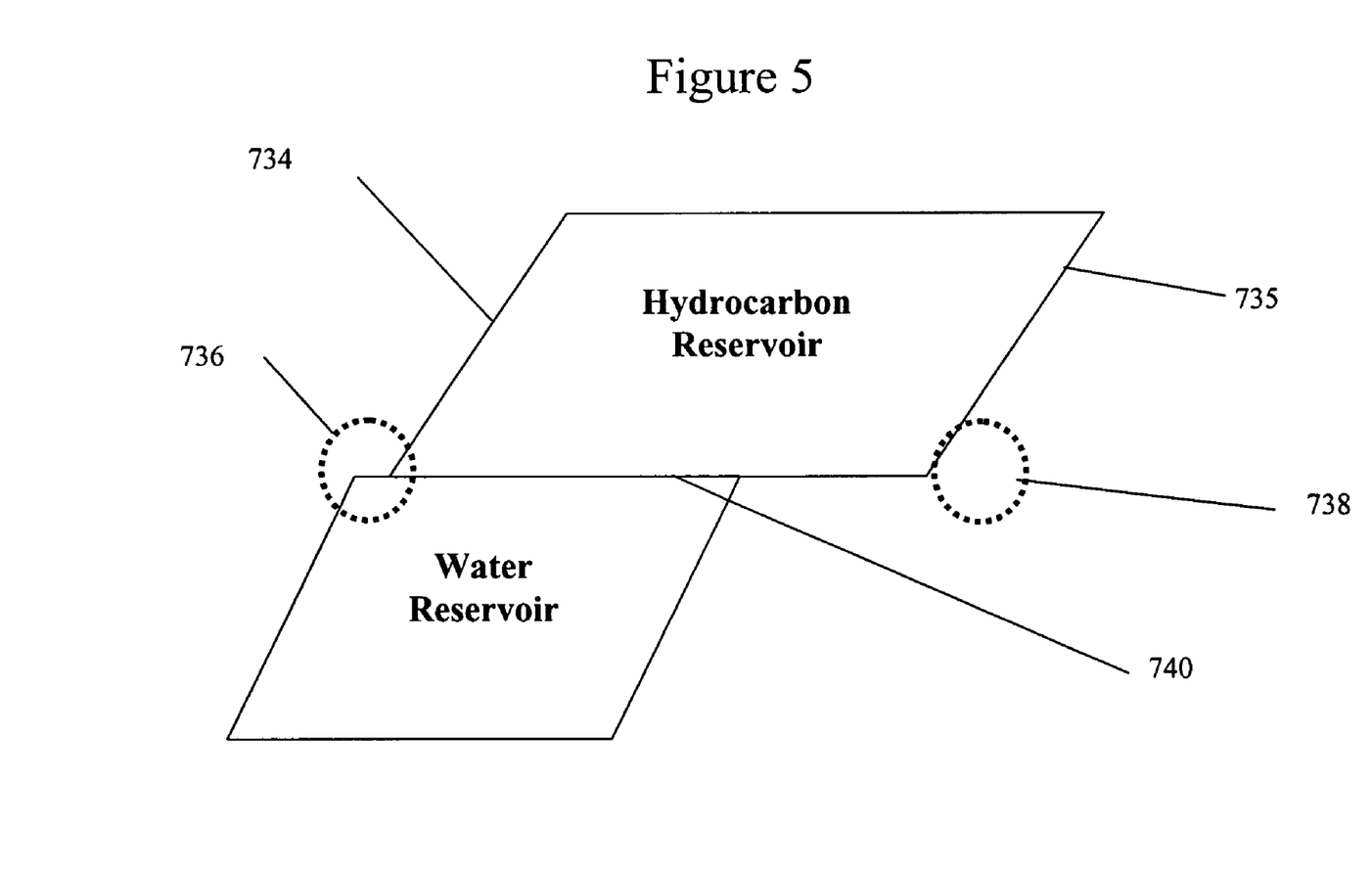
FIG. 5 shows the edge of the interface of a hydrocarbon reserve with a water reservoir.

FIG. 5 shows the edge of the interface of a hydrocarbon reserve with a water reservoir. In this embodiment, the current method is used to identify the intersection on the edges of the oil and water interface 736 and 738. These edge points 736 and 738 are locations of large interferences above and below the interface. In this Figure the top surface 735 is connected through interface 740. The basel surface 735 is the lower boundary of the hydrocarbon or water reservoir identified by this method. For example, if the hydrocarbon and water reservoir is sandstone and the material beneath the sandstone is shale the basel surface is the interface between the sandstone and shale. There are two edges that occur in this Figures, the edge of the top surface and the interface, 136, and the edge of the basal surface and the interface 138.

FIG. 6 illustrates the dot product computation of the derivatives usable in the method of the inventor. As shown in FIG. 6, if at a location G, the components of the structural dip vector are dH1, dH2 and dH3 and if at a location G, the derivatives of the seismic attribute data are dAt1, dAt2, and dAt3 then the dot product is the sum of dH1 multiplied by dAt1, dH2 multiplied by dAt2 and dH3 multiplied by dAt3. If any of the quantities dH1, dH2, dH3, dAt1, dAt2 or dAt3 do not exist or cannot be computed as finite real numbers at a location G, then a dot product is not performed and a null value is stored at the location G in the 3D output volume.

Figure 7:
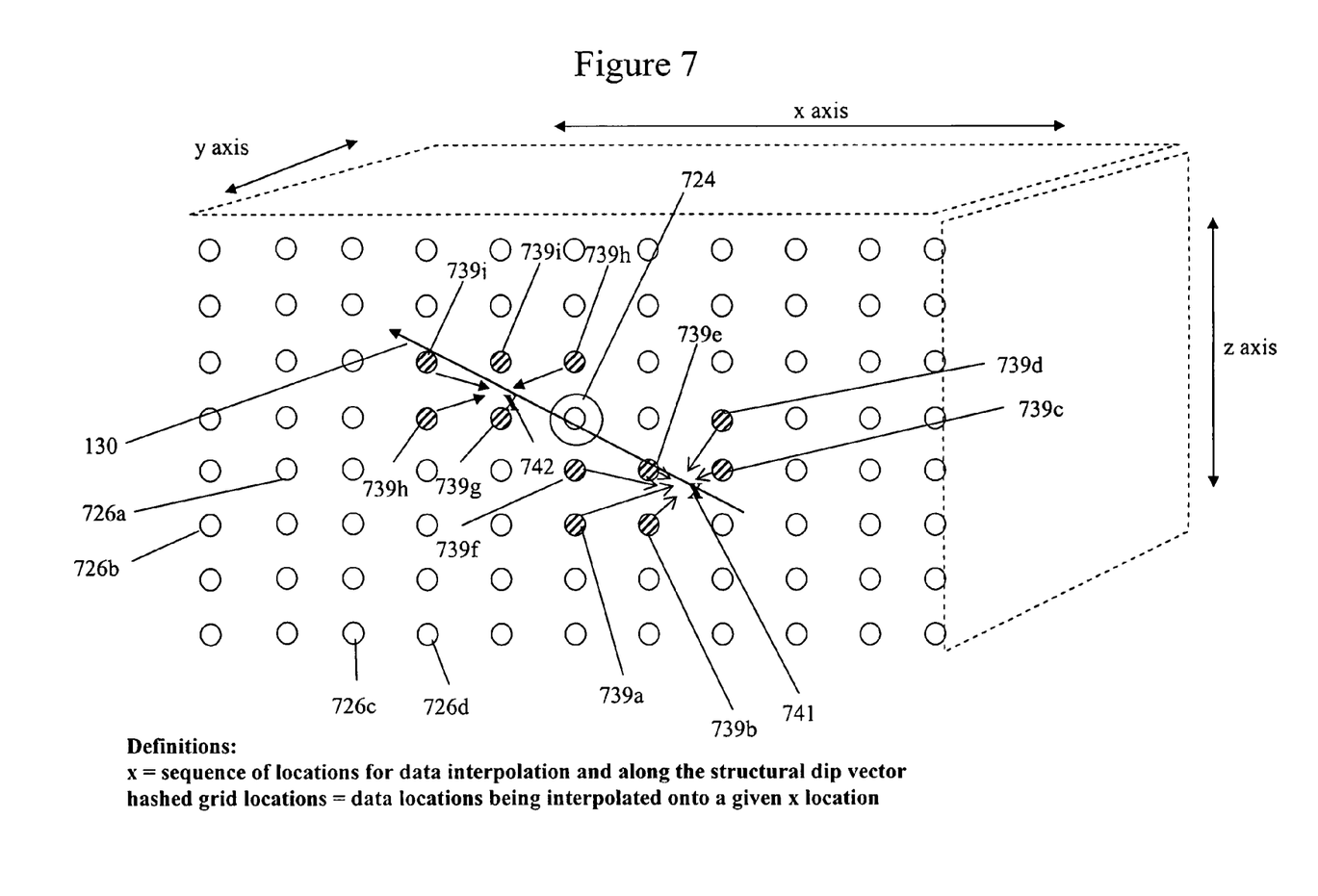
FIG. 7 illustrates the calculation of the interpolated derivatives of the seismic attributes along a structural dip vector

FIG. 7 illustrates the calculation of the interpolated derivatives of the seismic attributes along a structural dip vector using grid points 726a-726c around each reliability location 724, thereby forming projected seismic attribute data and thereby computing at least one derivative along the structural dip vector 130, as shown in FIG. 7. The result of this calculation is effectively a gradient of the seismic attribute data in the direction of structural dip. In this figure the X's are a sequence of locations for data interpolation and along the structural dip vector. The first set of hatched circles 739a-749f are grid locations of seismic attribute data that will be interpolated onto the structural dip vector 130 at location x 741. A second set of hashed circles 739g-739k at grid locations of seismic attribute data that will be interpolated onto the structural dip vector 130 at location x 742.

Figure 8:
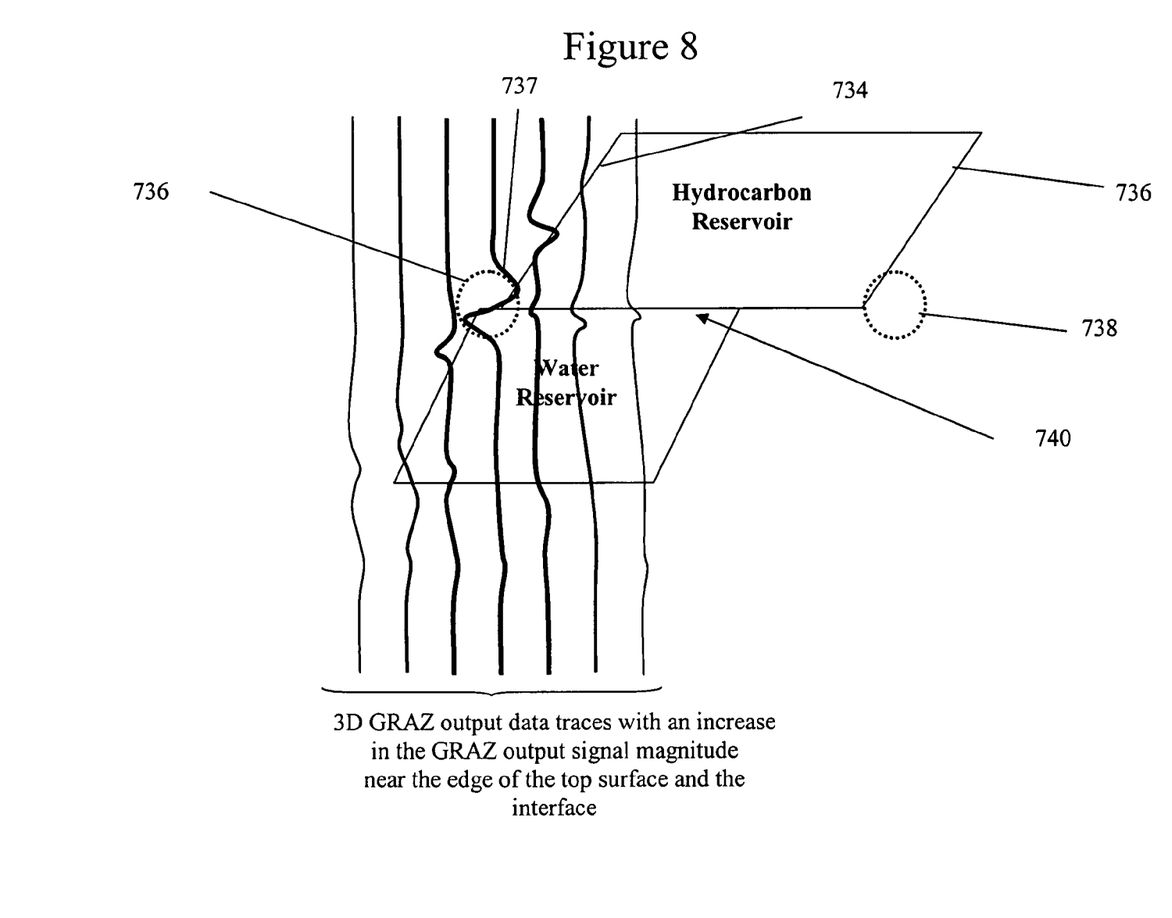
FIG. 8 illustrates the edge of the interface of a hydrocarbon reserve with a water reservoir and the increase in GRAZ output signal magnitude.

Large gradients at a specified time or specified depth can be tied to the existence of a fluid contact when other support geological and geophysical interpretations are available to validate the assertion. For example, FIG. 8 illustrates the edge of the interface of a hydrocarbon reserve with a water reservoir 736 and the increase in GRAZ output signal magnitude 737. Element 144 points to the edge of the top surface 734 and the interface 740 with an increased GRAZ output signal magnitude. The edge of the basal surface 735 and the outer edge 738.

Figure 9:
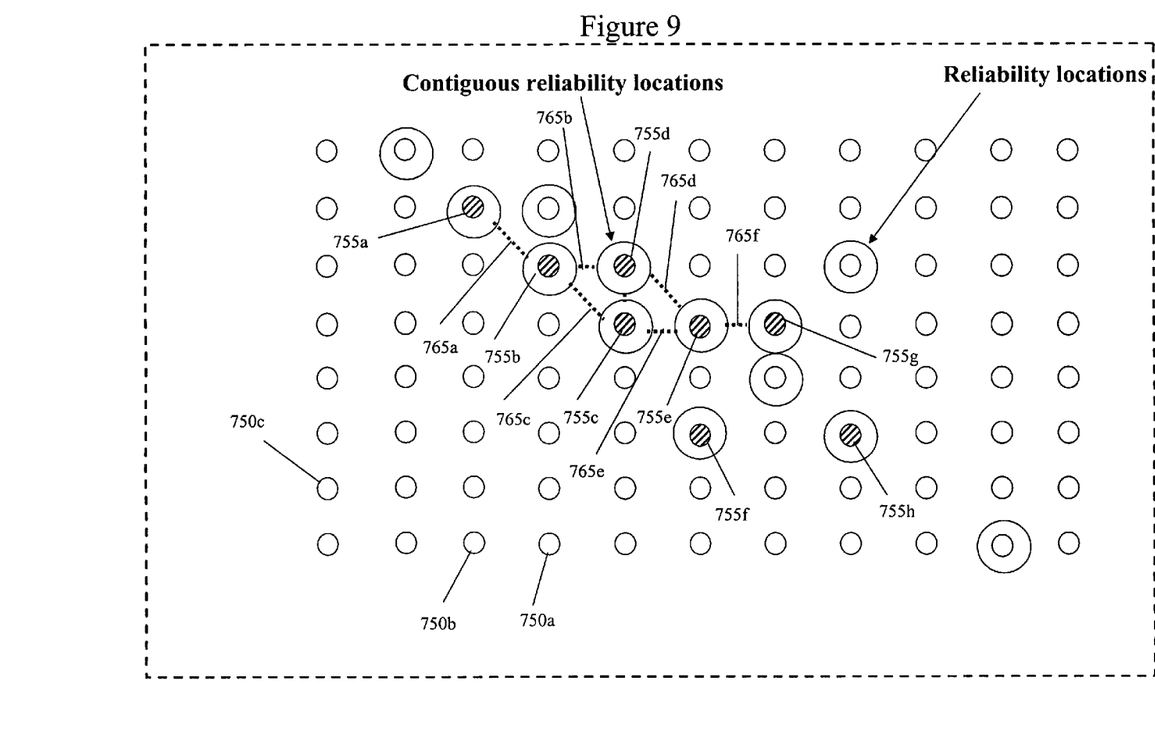
FIG. 9 shows a grouping of contiguous significant GRAZ output signal locations.

FIG. 9 shows horizontal grid nodes 750a-750c rather than the previously presented vertical grid nodes. An identified contiguous reliability location magnitude of a gradient computed from the 3D output volume using the data from FIG. 8. In FIG. 9 the hatched circles 755a-755h show reliability locations with statistically significant gradient dot product values. The dotted lines gradient dot product values 765a-765f connect members of the group of contiguous that are statistically significant.

Figure 10:
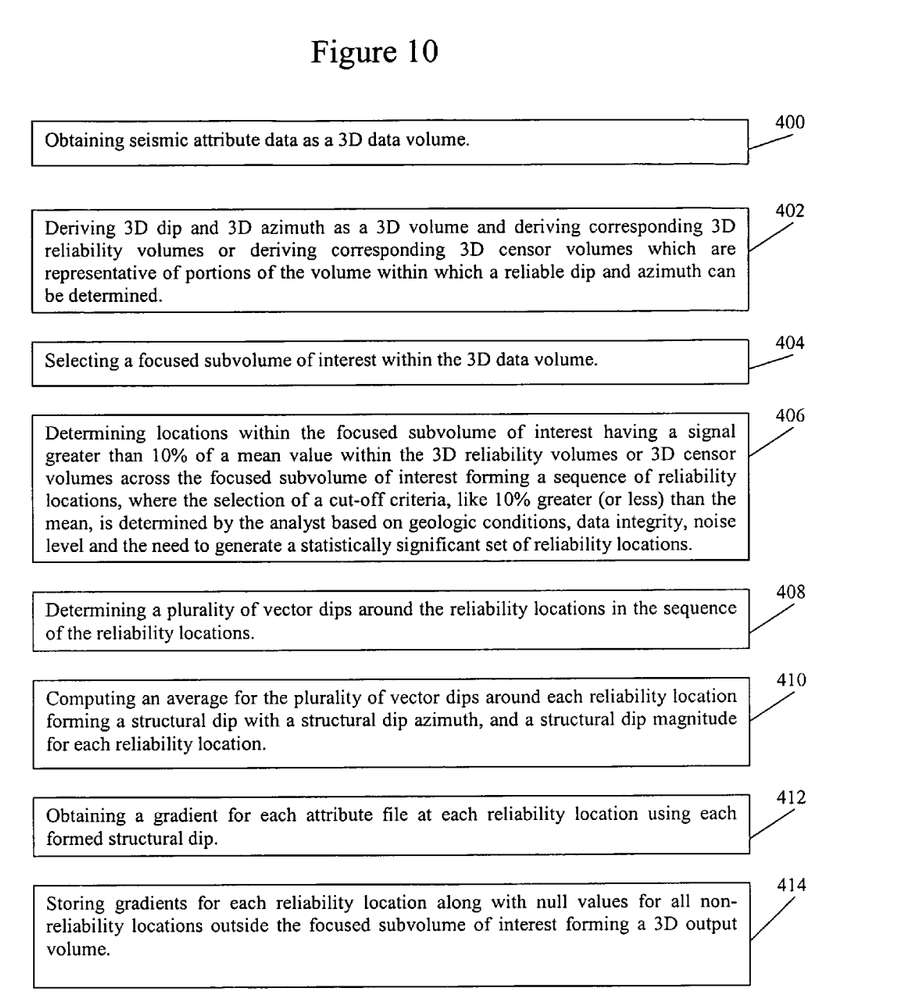
FIG. 10 shows the flowchart of the invention.

FIG. 10 is a flowchart of the method. Element 410 obtains seismic attribute data as a 3D data volume. Element 402 derives 3D dip and 3D azimuth as a 3D volume and deriving corresponding 3D reliability volumes or deriving corresponding 3D censor volumes which are representative of portions of the volume within which a reliable dip and azimuth can be determined. Element 404 then selects a focused subvolume of interest within the 3D data volume. Element 406 determines locations within the focused subvolume of interest having a signal greater than 10% of a mean value within the 3D reliability volumes or 3D censor volumes across the focused subvolume of interest forming a sequence of reliability locations, where the selection of a cut-off criteria, like 10% greater (or less) than the mean, is determined by the analyst based on geologic conditions, data integrity, noise level and the need to generate a statistically significant set of reliability locations. Element 408 determines a plurality of vector dips around the reliability locations in the sequence of the reliability locations. Element 410 computes an average for the plurality of vector dips around each reliability location forming a structural dip with a structural dip azimuth, and a structural dip magnitude for each reliability location. Element 412 obtains a gradient for each attribute file at each reliability location using each formed structural dip. Element 414 stores gradients for each reliability location along with null values for all non-reliability locations outside the focused subvolume of interest forming a 3D output volume.

In an embodiment, the resulting 3D output volume consists of gradients and null values.

The seismic attribute is selected from the group: seismic amplitude, inverted seismic amplitude; Hilbert transform output, prestack derived attributes, fluid factor, lamda, rho and mu attributes, multi-attribute classification outputs, seismic velocity or combinations thereof.

An embodiment of the method further contemplates that following steps are repeated for all regions of interest in a 3D seismic data set to obtain the most accurate results, namely, the steps of:

a. selecting a focused subvolume of interest within the 3D data volume b. determining locations within the focused subvolume of interest having a signal greater than 10% of a mean value within the 3D reliability volumes or 3D censor volumes across the focused subvolume of interest forming a sequence of reliability locations, where the selection of a cut-off criteria, like 10% greater (or less) than the mean, is determined by the analyst based on geologic conditions, data integrity, noise level and the need to generate a statistically significant set of reliability locations;

c. determining a plurality of vector dips around the reliability locations in the sequence of the reliability locations;

d. computing an average for the plurality of vector dips around each reliability location forming a structural dip with a structural dip azimuth, and a structural dip magnitude for each reliability location;

e. obtaining a gradient of at least one of the attributes of the 3D data volume, forming dot products using the gradient with at least one structural vector at each reliability location; and f. storing dot products for each reliability location along with null values for all non-reliability locations outside the focused subvolume of interest forming a 3D output volume, and g. repeating the method for the 3D output volume.

The method further contemplates using a user specified sequence of distances for seismic attribute data interpolation, such as −1 and +1 in units of grid nodes.

In one embodiment instead of seismic attribute data, derived rock property data is used. Derived rock property data can be well log resistivity or Sw.

In an alternating embodiment the interpolating of seismic attribute data is performed using weighted interpolation method. Incorporated by reference herein is the weighted interpolation method model from P. A. Burrough, "Principles of Geographical Information System," by Oxford University Press, 1998, see also the weighted interpolation method by O. Dubrule, see "Seismic Data Integration in Earth Models" from the Distinguished Instructor Series No. 6 of the European Association of Geoscientists & Engineers 2003. These methods allow the user to specify the style of interpolation to use in projecting the data on the direction of the flat spot dip vector using an inverse distance weighted interpolation method that includes a weighting function, such as reflection strength in the numerator and the distance raised to the jth power in the denominator, such as the weight for any given datapoint. The inverse distance weighted interpolation method uses the formula weight=(weighting function)/(distance to the interpolation point)$^j$, wherein j is a real number or zero.

The method can be used to generating a plurality of contiguous reliability location gradients which highlight interfaces of water with hydrocarbons in subsurface geological structures. See FIG. 9 which shows contiguous reliability locations at locations where the output GRAZ signal magnitude is statistically significant relative to a user specified cut-off level.

The method can be used iteratively and applied to any 3D seismic data on the earth.

The dot product component of this method is determined by performing a summation at each reliability location of the product of: (1) derivatives of the seismic attribute 3D data volumes corresponding to coordinate directions and (2) at least three components of the structural dip vector at each reliability location.

Each derivative is determined at reliability locations where components of the structural dip vector are finite real numbers and where the seismic attribute data at the reliability location and the interpolated seismic attribute data are finite real numbers.

In an embodiment wherein the dot product is determined at reliability locations where components of the structural dip vector are finite real numbers at least three coordinate direction derivatives of the seismic attribute data are used which are finite and real numbers In discussing this invention, several terms require consistent definition. The water reservoir is a geologic rock formation having both porosity and permeability and saturated primarily by water. The water formation may contain a partial hydrocarbon saturation, but at a sufficiently low level so as to preclude economic development.

Similarly, the hydrocarbon reservoir is a geologic rock formation having both porosity and permeability and saturated in most cases by a combination of water and hydrocarbons. The saturation of hydrocarbons must be sufficiently high so as to allow economic development. If the saturation of hydrocarbons does not allow the production of hydrocarbons and associated water in quantities that are commercial, the reservoir would not be called a hydrocarbon reservoir. Typically, the hydrocarbon reservoir is found up-structure of the water reservoir, which is located down-structure. In this discussion, up-structure refers to shallower depths from the surface within the earth. Down-structure refers to deeper depths within the earth. In the case of seismic travel times, deeper depths correspond to larger absolute value seismic travel times and shallower depths to smaller absolute value travel times.

Both depths and seismic travel times are typically measured from a specified datum. The datum is a specified surface to which measurements are referenced. For example, in off-shore exploration and production, the datum is typically taken to be mean sea level. Depths or seismic times are then referenced to mean sea level as the datum.

In one embodiment the method can be for determining the existence of and location of hydrocarbon and water fluid contacts by analyzing spatial changes in 3D seismic data. The method obtains seismic attribute data as a 3D data volume. The method can additionally obtain 3D dip and azimuth data as at least one set of 3D volume data and deriving corresponding 3D reliability volumes or deriving corresponding 3D censor volumes which are representative of portions of the at least one set of 3D volume data which 3D dip data and azimuth data can be reliably determined. The method can additionally select a focused subvolume of interest within the at least one set of 3D volume data. It is possible for the method to determine reliability locations within the focused subvolume of interest having a non-null 3D dip data and non-null 3D azimuth data within the 3D reliability volumes or 3D censor volumes across the focused subvolume of interest forming a sequence of reliability locations. The method is also able to compute an average for a plurality of vector dips around each reliability location in the sequence of the reliability locations forming at least one structural dip vector for each reliability location. The method can additionally obtain a gradient for the 3D data volume at each reliability location using each formed structural dip. The method can also store the gradients for each reliability location forming a 3D output subvolume. The method is able to repeat for the 3D output volume.

In one embodiment the gradient is computed by interpolating seismic attribute data onto the structural dip vector for each reliability location forming projected seismic attribute data and computing at least one derivative along the structural dip vector.

In an alternate embodiment the gradient is computed by determining derivatives of the seismic attribute data in at least three coordinate directions, X-Y-Z, forming a dot product using the at least three coordinate direction derivatives and the structural dip vector.

In yet another embodiment the seismic attribute is selected from the group: seismic amplitude, inverted seismic amplitude; Hilbert transform output, prestack derived attributes, fluid factor, lamda, rho and mu attributes, multi-attribute classification outputs, seismic velocity or combinations thereof.

In one embodiment the gradients are for a range of specified times or a range of specified depths.

Another embodiment uses a user specified sequence of distances for seismic attribute data interpolation.

It is possible that in one embodiment that instead of seismic attribute data, derived rock property data is used.

In one embodiment interpolating of seismic attribute data is performed using weighted interpolation method.

In yet another embodiment the step of generating a plurality of contiguous reliability location gradients which highlight interfaces of water with hydrocarbons in subsurface geological structures.

In another embodiment the step of generating a plurality of contiguous reliability location gradients which highlight the edge of the interfaces of water with hydrocarbons in subsurface geological structures.

In one embodiment the dot product is determined by performing a summation at each reliability location of the product of: (1) derivatives of the seismic attribute 3D data volume corresponding to the three coordinate directions, X-Y-Z, times (2) at least three components of the structural dip vector at each reliability location.

In yet another embodiment each derivative is determined at reliability locations where components of the structural dip vector are finite real numbers and where the seismic attribute data at the reliability location and the interpolated seismic attribute data are finite real numbers.

In one embodiment dot product is determined at reliability locations where components of the structural dip vector are finite real numbers and wherein the at least three coordinate direction derivatives of the seismic attribute data are finite real numbers.

One embodiment may include computer instructions on a computer readable media, comprising instructions to cause a processor to determining the existence of and location of hydrocarbon and water fluid contacts by analyzing spatial changes in 3D seismic data. The method obtains seismic attribute data as a 3D data volume. The method can additionally obtain 3D dip and azimuth data as at least one set of 3D volume data and deriving corresponding 3D reliability volumes or deriving corresponding 3D censor volumes which are representative of portions of the at least one set of 3D volume data which 3D dip data and azimuth data can be reliably determined. The method can additionally select a focused subvolume of interest within the at least one set of 3D volume data. It is possible for the method to determine reliability locations within the focused subvolume of interest having a non-null 3D dip data and non-null 3D azimuth data within the 3D reliability volumes or 3D censor volumes across the focused subvolume of interest forming a sequence of reliability locations. The method is also able to compute an average for a plurality of vector dips around each reliability location in the sequence of the reliability locations forming at least one structural dip vector for each reliability location. The method can additionally obtain a gradient for the 3D data volume at each reliability location using each formed structural dip. The method can also store the gradients for each reliability location forming a 3D output subvolume. The method is able to repeat for the 3D output volume.

While this invention has been described with emphasis on the preferred embodiments, it should be understood that within the scope of the appended claims, the invention might be practiced other than as specifically described herein.

What is claimed is:

1. A method of determining the existence of and location of hydrocarbon and water fluid contacts by analyzing spatial changes in a 3D seismic data set comprising the steps of:
    a. obtaining seismic attribute data comprising attributes as a 3D data volume;
    b. obtaining 3D dip and azimuth data as at least one set of 3D volume data and deriving corresponding 3D reliability volumes or deriving corresponding 3D censor volumes which are representative of portions of the at least one set of 3D volume data which 3D dip data and azimuth data can be reliably determined;
    c. selecting a focused subvolume of interest within the at least one set of 3D volume data;
    d. determining reliability locations within the focused subvolume of interest having a non-null 3D dip data and non-null 3D azimuth data within the 3D reliability volumes or 3D censor volumes across the focused subvolume of interest forming a sequence of reliability locations;
    e. computing an average for a plurality of vector dips around each reliability location in the sequence of the reliability locations forming at least one structural dip vector for each reliability location;
    f. obtaining a gradient of at least one of the attributes of the 3D data volume forming dot products using the gradient with at least one structural vector at each reliability location;
    g. storing the dot products for each reliability location forming a 3D output subvolume; and
    h. repeating the method for the 3D output volume.

2. The method of claim 1, wherein the dot products are computed by interpolating seismic attribute data onto the structural dip vector for each reliability location forming projected seismic attribute data and computing at least one derivative along the structural dip vector.

3. The method of claim 1, wherein the dot products are computed by determining derivatives of the seismic attribute data in at least three coordinate directions, X-Y-Z, forming a dot product using the at least three coordinate direction derivatives and the structural dip vector.

4. The method of claim 1, wherein the seismic attribute data is selected from the group: seismic amplitude, inverted seismic amplitude, windowed RMS of seismic amplitude; Hilbert transform output, prestack derived attributes, fluid factor, lamda, rho and mu attributes, multi-attribute classification outputs, seismic velocity or combinations thereof.

5. The method of claim 1, wherein the dot products are for a range of specified times or a range of specified depths.

6. The method of claim 1, further comprising using a user specified sequence of distances for seismic attribute data interpolation.

7. The method of claim 1, wherein the interpolating of seismic attribute data is performed using weighted interpolation method.

8. The method of claim 1, further comprising the step of generating a plurality of contiguous reliability location gradients which highlight interfaces of water with hydrocarbons in subsurface geological structures.

9. The method of claim 8, further comprising the step of generating a plurality of contiguous reliability location gradients which highlight the edge of the interfaces of water with hydrocarbons in subsurface geological structures.

10. The method of claim 3, wherein the dot product is determined by performing a summation at each reliability location of the product of: (1) derivatives of the seismic attribute 3D data volume corresponding to the three coordinate directions, X-Y-Z, times (2) at least three components of the structural dip vector at each reliability location.

11. The method of claim 2, wherein each derivative is determined at reliability locations where components of the structural dip vector are finite real numbers and where the seismic attribute data at the reliability location and the interpolated seismic attribute data are finite real numbers.

12. The method of claim 3, wherein dot product is determined at reliability locations where components of the structural dip vector are finite real numbers and wherein the at least three coordinate direction derivatives of the seismic attribute data are finite real numbers.

13. Computer instructions on a computer readable media, comprising instructions to cause a processor to determining the existence of and location of hydrocarbon and water fluid contacts by analyzing spatial changes in a 3D seismic data set comprising the steps of:
    a. obtaining seismic attribute data comprising attributes as a 3D data volume;
    b. obtaining 3D dip and azimuth data as at least one set of 3D volume data and deriving corresponding 3D reliability volumes or deriving corresponding 3D censor volumes which are representative of portions of the at least one set of 3D volume data which 3D dip data and azimuth data can be reliably determined;
    c. selecting a focused subvolume of interest within the at least one set of 3D volume data;

d. determining reliability locations within the focused subvolume of interest having a non-null 3D dip data and non-null 3D azimuth data within the 3D reliability volumes or 3D censor volumes across the focused subvolume of interest forming a sequence of reliability locations;

e. computing an average for a plurality of vector dips around each reliability location in the sequence of the reliability locations forming at least one structural dip vector for each reliability location;

i. obtaining a gradient of at least one of the attributes of the 3D data volume, forming dot products using the gradient with at least one structural vector at each reliability location;

f. storing the dot products for each reliability location forming a 3D output subvolume; and g. repeating the method for the 3D output volume.

* * * * *